United States Patent
Tang et al.

(10) Patent No.: US 10,347,911 B2
(45) Date of Patent: Jul. 9, 2019

(54) LITHIUM HYDROGEN TITANATE LI—H—TI—O MATERIAL AND METHOD FOR MAKING THE SAME

(71) Applicants: TSINGHUA UNIVERSITY, Beijing (CN); Massachusetts Institute of Technology, Cambridge, MA (US)

(72) Inventors: Zi-Long Tang, Beijing (CN); Shi-Tong Wang, Beijing (CN); Zhong-Tai Zhang, Beijing (CN); Ju Li, Cambridge, MA (US)

(73) Assignees: TSINGHUA UNIVERSITY, Beijing (CN); NATIONAL SCIENCE FOUNDATION, Arlington, VA (US)

( * ) Notice: Subject to any disclaimer, the term of this patent is extended or adjusted under 35 U.S.C. 154(b) by 302 days.

(21) Appl. No.: 15/250,043

(22) Filed: Aug. 29, 2016

(65) Prior Publication Data
US 2018/0062163 A1    Mar. 1, 2018

(51) Int. Cl.
*H01M 4/485* (2010.01)
*H01M 10/0525* (2010.01)
*C01G 23/00* (2006.01)

(52) U.S. Cl.
CPC .......... *H01M 4/485* (2013.01); *C01G 23/005* (2013.01); *H01M 10/0525* (2013.01); *C01P 2002/20* (2013.01); *C01P 2002/30* (2013.01); *C01P 2002/32* (2013.01); *C01P 2002/72* (2013.01); *C01P 2004/03* (2013.01); *C01P 2004/04* (2013.01); *C01P 2004/24* (2013.01); *C01P 2006/40* (2013.01)

(58) Field of Classification Search
CPC ............. H01M 4/485; H01M 10/0525; C01G 23/005; C01P 2002/20; C01P 2002/30; C01P 2002/72; C01P 2004/03; C01P 2004/04; C01P 2004/24; C01P 2006/40
See application file for complete search history.

(56) References Cited

FOREIGN PATENT DOCUMENTS

CN    104900861 A    9/2015

*Primary Examiner* — Helen Oi K Conley

(57) ABSTRACT

A lithium hydrogen titanate Li—H—Ti—O material includes Li, H, Ti, and O elements, wherein a mass percentage of Li is in a range from about 3% to about 12%, a mass percentage of H is in a range from about 0.1% to about 8%, a mass percentage of Ti is in a range from about 46% to about 56%, and a mass percentage of O is in a range from about 28% to about 50%. A lithium ion battery and a method for making the lithium hydrogen titanate Li—H—Ti—O material are also disclosed.

14 Claims, 13 Drawing Sheets

US 10,347,911 B2

LITHIUM HYDROGEN TITANATE LI—H—TI—O MATERIAL AND METHOD FOR MAKING THE SAME

FIELD

The present disclosure relates to lithium hydrogen titanate Li—H—Ti—O materials and methods for making the same.

BACKGROUND

As markets increasingly grow for electric vehicles and portable electronic devices, development of quick charging/discharging, long lifespan, and high safety lithium ion batteries is desired. Compared to graphite, Li—Ti—O materials (e.g., lithium titanate and $TiO_2$) as anode active materials of lithium ion batteries draw attention by having smaller volume change during lithiation/delithiation, better high-rate performance, cycling stability, and safety. For example, $Li_4Ti_5O_{12}$, as one of the Li—Ti—O materials, is a binary $Li_2O$—$TiO_2$ composition as $Li_4Ti_5O_{12}$ can be seen as $2Li_2O.5TiO_2$. $Li_4Ti_5O_{12}$ has a "zero stain" nature meaning substantially no volume change in the material during cycling, a high potential for lithium insertion (1.55V vs. $Li/Li^+$) with no lithium metal deposition, and a high coulombic efficiency. Anatase $TiO_2$, as another Li—Ti—O material, has a quick insertion/extraction of lithium ions, and a small volume change (e.g., 3%~4%) during the lithium insertion.

BRIEF DESCRIPTION OF THE DRAWINGS

Implementations are described by way of example only with reference to the attached figures.

DETAILED DESCRIPTION

Figure 1:
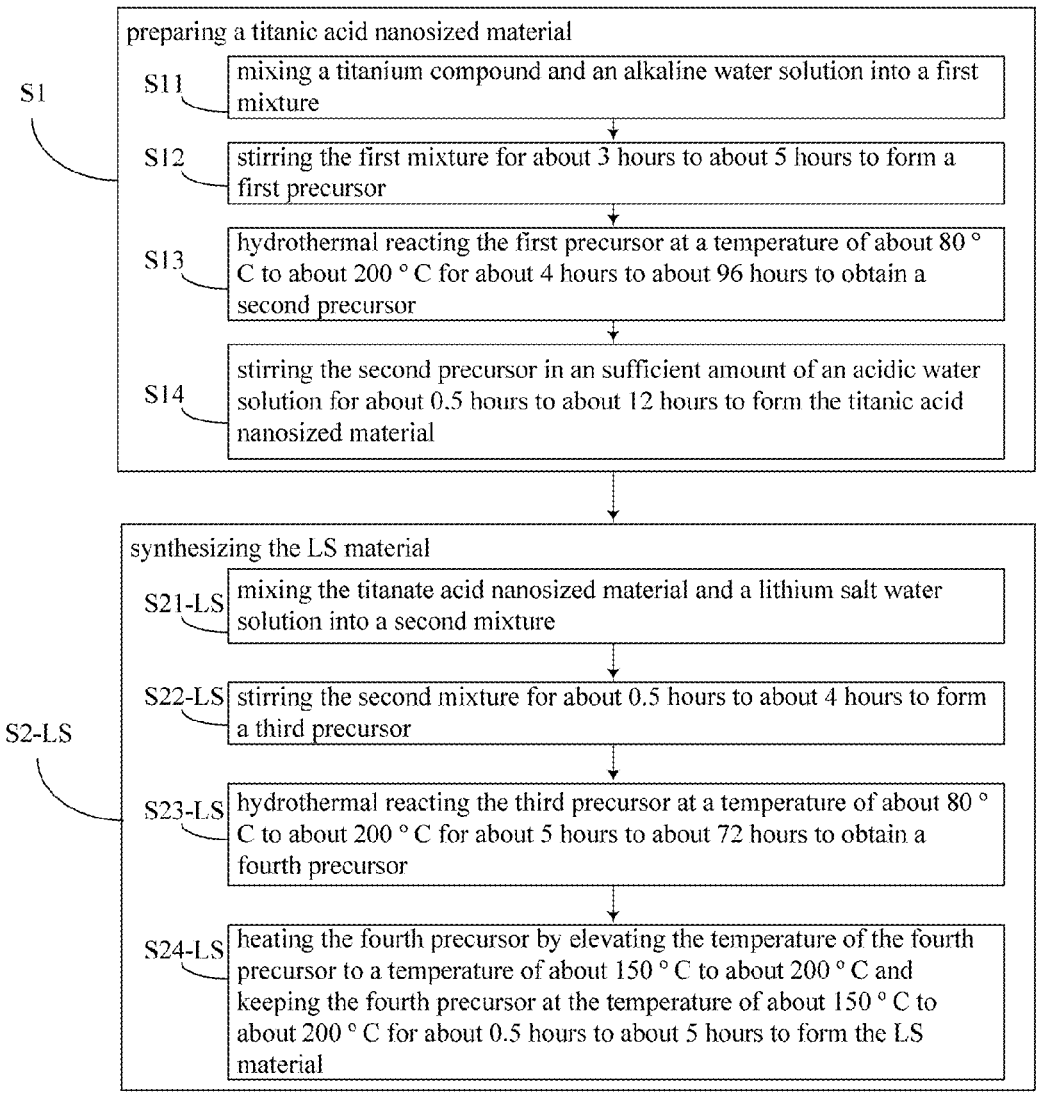
FIG. 1 is a flow chart of an embodiment of a method for making a lithium hydrogen titanate Li—H—Ti—O material.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented. The term "comprise" or "comprising" when utilized, means "include or including, but not necessarily limited to"; it specifically indicates open-ended inclusion or membership in the so-described combination, group, series, and the like. The terms "comprise", "comprising", "include", and "including" do not suggest that another undisclosed feature, element, component, or step must be required. Therefore, when using the term "comprise", "comprising", "include", or "including", the term "consist of" or "consisting of" can also be applied.

A first embodiment of a lithium hydrogen titanate Li—H—Ti—O material comprises lithium (Li), hydrogen (H), titanium (Ti), and oxygen (O) elements, wherein a mass percentage of Li is in a range from about 3% to about 10%, a mass percentage of H is in a range from about 0.3% to about 8%, a mass percentage of Ti is in a range from about 46% to about 53%, and a mass percentage of O is in a range from about 30% to about 50%.

The first embodiment of the lithium hydrogen titanate Li—H—Ti—O material can be represented by a chemical formula of $Li_{(0.43\ to\ 1.44)}H_{(0.29\ to\ 7.93)}Ti_{(0.96\ to\ 1.11)}O_{(1.88-x\ to\ 3.13-x)}$, wherein $0 \leq x \leq 1.81$. The lithium hydrogen titanate Li—H—Ti—O material can comprise a vacancy which occupies an oxygen site ("O vacancy"). The amount of the O vacancy is x in the formula.

The first embodiment of the lithium hydrogen titanate Li—H—Ti—O material can be a "layered structure" (LS) material. The term "layered structure" (LS) refers to the crystal structure of the material, i.e., the layer type arrangement of unit cells in the crystal structure, and not to the appearance of the material, which may or may not appear layered. The layer type arrangement of the unit cells can provide many fast $Li^+$ conducting pathways. The LS material comprises pseudohydrates which can be at least one of hydroxide ions ($OH^-$), hydroxonium ions ($H_3O^+$), —OH groups, and —H groups. A molar ratio of the pseudohydrates to the Ti element can be larger than 0.3. The layered structure of the lithium hydrogen titanate Li—H—Ti—O material can be sustained by having a sufficient amount of the pseudohydrates.

A second embodiment of the lithium hydrogen titanate Li—H—Ti—O material comprises Li, H, Ti, and O elements, wherein a mass percentage of Li is in a range from about 4% to about 12%, a mass percentage of H is in a range from about 0.1% to about 5%, a mass percentage of Ti is in a range from about 48% to about 56%, and a mass percentage of O is in a range from about 28% to about 47%.

The second embodiment of the lithium hydrogen titanate Li—H—Ti—O material can be represented by a chemical formula of $Li_{(0.58\ to\ 1.73)}H_{(0.10\ to\ 4.96)}Ti_{(1.00\ to\ 1.17)}O_{(1.75-x\ to\ 2.93-x)}$, wherein $0 \le x \le 1.73$. The lithium hydrogen titanate Li—H—Ti—O material can comprise a vacancy which occupies an oxygen site ("O vacancy"). The amount of the O vacancy is x in the formula.

Some of the Li, Ti, and O elements in the second embodiment of the lithium hydrogen titanate Li—H—Ti—O material are in forms of a plurality of $Li_4Ti_5O_{12}$ and $TiO_2$ nanostructures, and the plurality of $Li_4Ti_5O_{12}$ and $TiO_2$ nanostructures are uniformly and dispersingly distributed in the second embodiment of the lithium hydrogen titanate Li—H—Ti—O material. The first embodiment of a lithium hydrogen titanate Li—H—Ti—O material can be a plurality of nanosheets or a plurality of nanotubes, and the second embodiment of the lithium hydrogen titanate Li—H—Ti—O material can further comprises the plurality of $Li_4Ti_5O_{12}$ and $TiO_2$ nanostructures that are uniformly grown on the plurality of nanosheets or the plurality of nanotubes.

The second embodiment of the lithium hydrogen titanate Li—H—Ti—O material can be a "hydrated nanocomposite" (HN) material. The HN material comprises LS material and a plurality of $Li_4Ti_5O_{12}$ and $TiO_2$ nanostructures uniformly and dispersingly grown on the LS material. In the HN material, a molar ratio of the pseudohydrates can be larger than 0, and can be about 0.3 wt % to about 5 wt % of the HN material in some embodiments. The $Li_4Ti_5O_{12}$ and $TiO_2$ nanostructures can be smaller than 10 nanometers (nm). In one embodiment, sizes of the $Li_4Ti_5O_{12}$ and $TiO_2$ nanostructures are about 2 nm to about 5 nm. The plurality of $Li_4Ti_5O_{12}$ and $TiO_2$ nanostructures can be in situ grown on the LS material. In one embodiment, the LS material is a plurality of nanosheets or nanotubes, and the plurality of $Li_4Ti_5O_{12}$ and $TiO_2$ nanostructures are uniformly grown on the plurality of nanosheets or nanotubes. The $Li_4Ti_5O_{12}$ can be a spinel structure and the $TiO_2$ can be an anatase structure, while the LS material in the HN material still maintains the layered structure.

The lithium hydrogen titanate Li—H—Ti—O material can be a series of materials in the $Li_2O$—$TiO_2$—$H_2O$ ternary composition.

Methods for making the lithium hydrogen titanate Li—H—Ti—O material are provided. Referring to FIG. 1, one embodiment of a method for making the lithium hydrogen titanate Li—H—Ti—O material comprising:

S1, preparing a titanic acid nanosized material; and

S2-LS, synthesizing the lithium hydrogen titanate Li—H—Ti—O material (LS material).

Figure 2:
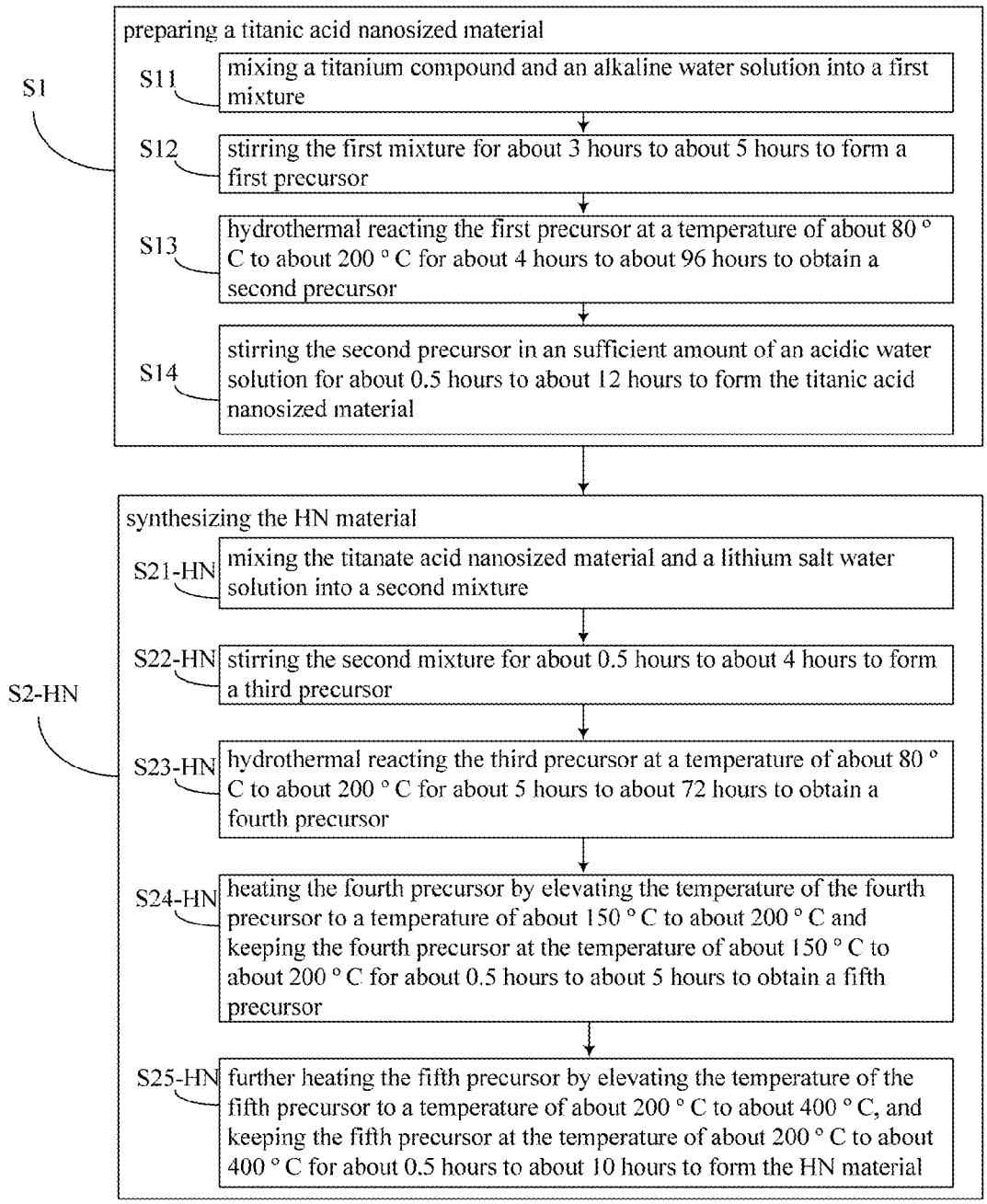
FIG. 2 is a flow chart of another embodiment of the method for making the lithium hydrogen titanate Li—H—Ti—O material.

Referring to FIG. 2, another embodiment of the method for making the lithium hydrogen titanate Li—H—Ti—O material comprising steps:

S1, preparing a titanic acid nanosized material; and

S2-HN, synthesizing the lithium hydrogen titanate Li—H—Ti—O material (HN material).

In step S1, the titanate acid nanosized material is prepared by a method comprising the following steps:

S11, mixing a titanium compound and an alkaline water solution into a first mixture;

S12, stirring the first mixture for about 3 hours to about 5 hours to form a first precursor;

S13, hydrothermal reacting the first precursor at a temperature of about 80° C. to about 200° C. for about 4 hours to about 96 hours to obtain a second precursor; and S14, stirring the second precursor in a sufficient amount of an acidic water solution for about 0.5 hours to about 12 hours to form the titanic acid nanosized material.

In step S11, the titanium compound can be selected from at least one of anatase titanium dioxide, rutile titanium dioxide, metatitanic acid ($TiO(OH)_2$), amorphous titanium dioxide, and titanate.

The alkaline water solution can be a water solution of alkali. The alkali can be at least one of sodium hydroxide (NaOH) and potassium hydroxide (KOH).

A concentration of the alkali in the alkaline water solution can be about 5 mol/L to about 20 mol/L. A ratio between the titanium compound and the alkaline water solution can be 3 g to 14 g of the titanium compound per 100 mL of the alkaline water solution.

In step S14, the acidic water solution can be a water solution of an acid. The acid can be at least one of nitric acid, hydrochloric acid, sulfuric acid, acetic acid, phosphoric acid, oxalic acid, and hydrofluoric acid. A concentration of the acid in the acid water solution can be about 0.1 mol/L to about 0.8 mol/L.

After step S14, step S1 can further comprise a purification step for the formed titanic acid nanosized material by using centrifugalization or pump filtration. After that, a further step of water washing and drying the titanic acid nanosized material can be comprised by step S1. The resulted titanic acid nanosized material can be in a powder form.

The titanic acid nanosized material can be a layered structure material. In one embodiment, the titanic acid nanosized material are represented by a formula of $H_2Ti_nO_{2n+1} \cdot xH_2O$, wherein $2 \le n \le 9$ and $0 \le x \le 10$, such as $H_2Ti_2O_5 \cdot H_2O$ and $H_2Ti_3O_7$.

In step S2-LS, the LS material can be synthesized by a method comprising the following steps:

S21-LS, mixing the titanate acid nanosized material and a lithium salt water solution into a second mixture;

S22-LS, stirring the second mixture for about 0.5 hours to about 4 hours to form a third precursor;

S23-LS, hydrothermal reacting the third precursor at a temperature of about 80° C. to about 200° C. for about 5 hours to about 72 hours to obtain a fourth precursor; and S24-LS, heating the fourth precursor by elevating the temperature of the fourth precursor to a temperature of about 150° C. to about 200° C. and keeping the fourth precursor at the temperature of about 150° C. to about 200° C. for about 0.5 hours to about 5 hours to form the LS material.

In step S2-HN, the HN material can be synthesized by a method comprising the following steps:

S21-HN, mixing the titanate acid nanosized material and a lithium salt water solution into a second mixture;

S22-HN, stirring the second mixture for about 0.5 hours to about 4 hours to form a third precursor;

S23-HN, hydrothermal reacting the third precursor at a temperature of about 80° C. to about 200° C. for about 5 hours to about 72 hours to obtain a fourth precursor;

S24-HN, heating the fourth precursor by elevating the temperature of the fourth precursor to a temperature of about 150° C. to about 200° C. and keeping the fourth precursor at the temperature of about 150° C. to about 200° C. for about 0.5 hours to about 5 hours to obtain a fifth precursor; and S25-HN, further heating the fifth precursor by elevating the temperature of the fifth precursor to a temperature of about 200° C. to about 400° C., and keeping the fifth precursor at the temperature of about 200° C. to about 400° C. for about 0.5 hours to about 10 hours to form the HN material.

The lithium salt is soluble in water. A concentration of the lithium salt in the lithium salt water solution can be about 0.05 mol/L to about 2 mol/L. A ratio between the titanate acid nanosized material and the lithium salt water solution can be 0.1 g to 10 g of the titanate acid nanosized material per 100 mL of the lithium salt water solution.

The lithium salt can be at least one of inorganic lithium ion salt and organic lithium ion salt. A pH value of the lithium salt water solution can be in a range from about 8 to about 14.

The inorganic lithium salt can be at least one of lithium hydroxide, lithium oxide, lithium nitrate, lithium sulfate, lithium carbonate, lithium phosphate, lithium chlorate, lithium fluoride, lithium chloride, lithium bromide, and lithium iodide.

The organic lithium salt can be at least one of lithium formate, lithium acetate, lithium oxalate, lithium oleate, lithium tartrate, lithium citrate, lithium benzoate, lithium acrylate, lithium stearate, lithium methoxide, and lithium ethoxide.

The hydrothermal reacting of step S23-HN is in an alkaline environment at which pH value of the third precursor is 8 to 14. In the embodiment of using the lithium hydroxide, there is no need to further adjust the pH value. In the embodiment of using other lithium salt, such as at least one of lithium nitrate, lithium sulfate, lithium carbonate, lithium phosphate, lithium chlorate, lithium fluoride, lithium chloride, lithium bromide, and lithium iodide, the method can further comprise a step of adjusting the pH value of the third precursor to a range of 8 to 14, by adding alkaline agent such as sodium hydroxide or potassium hydroxide into the third precursor.

In steps S24-LS, S24-HN, and S25-HN, the heating and the further heating can be performed in vacuum, or in an atmosphere of air, inert gas, or reductive gas.

In steps S24-LS and S24-HN, the temperature of the fourth precursor can be elevated from room temperature to the temperature of about 150° C. to about 200° C. The room temperature can be in a range from about 15° C. to about 40° C. In steps S24-LS, S24-HN, and S25-HN, the temperature can be elevated at a speed of about 2° C./min to about 10° C./min.

In step S24-HN, the LS material is formed by elevating the temperature to a temperature of about 150° C. to about 200° C. and keeping the fourth precursor at the temperature of about 150° C. to about 200° C. for about 0.5 hours to about 5 hours. That is, the fifth precursor is the LS material.

In step S25-HN, $Li_4Ti_5O_{12}$ nanostructures and $TiO_2$ nanostructures can be in situ grown on the LS material by further heating the fifth precursor to the temperature of about 200° C. to about 400° C., and keeping the fifth precursor at the temperature of about 200° C. to about 400° C. for about 0.5 hours to about 10 hours. That is, the HN material comprises the LS nanosheets or nanotubes and further comprises a plurality of $Li_4Ti_5O_{12}$ and $TiO_2$ nanostructures uniformly and dispersingly grown on the LS nanosheets or nanotubes.

The titanate acid nanosized material is prepared by a strong alkali hydrothermal method in step S1 and has an ion exchange with the lithium salt dissolved in water in step S23-LS and step S23-HN. By having the layered structure of the titanate acid nanosized material, the fourth precursor formed by the hydrothermal reaction can preserve the layered structure of the material. The fourth precursor can be represented by a formula of $Li_mH_{2-m}Ti_nO_{2n+1} \cdot xH_2O$, wherein $0<m<2$. In one embodiment, the fourth precursor is $Li_{1.81}H_{0.19}Ti_2O_5 \cdot 2H_2O$ whose interlayer spacing is about 0.8 nm.

In step S24-LS and step S24-HN, the LS material is formed at a relatively low temperature (150° C. to 200° C.). In step S25-HN, the HN material is formed by a low temperature (200° C. to 400° C.) dehydrating method to in situ grow $Li_4Ti_5O_{12}$ and $TiO_2$ nanostructures that are uniformly and dispersingly distributed on the LS material.

Figure 3:
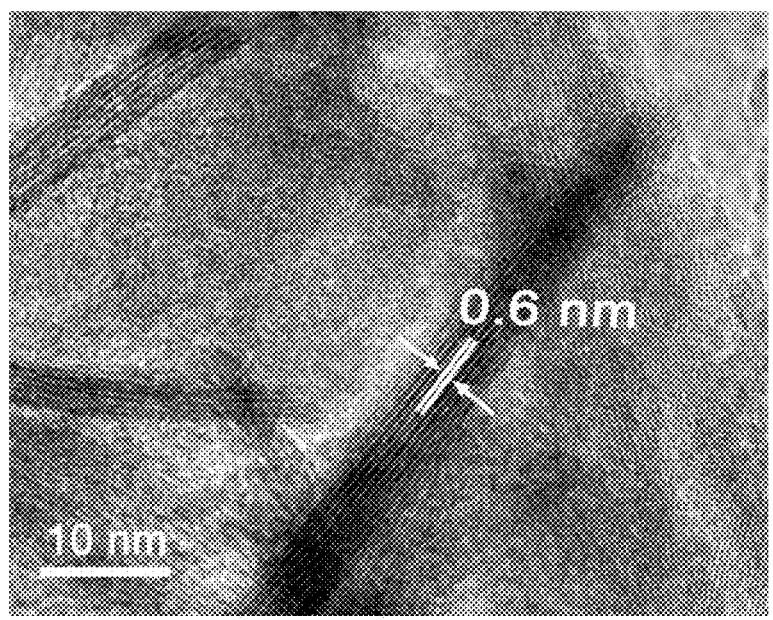
FIG. 3 is a high resolution transmission electron microscope (HRTEM) image of a LS material.
Figure 4:
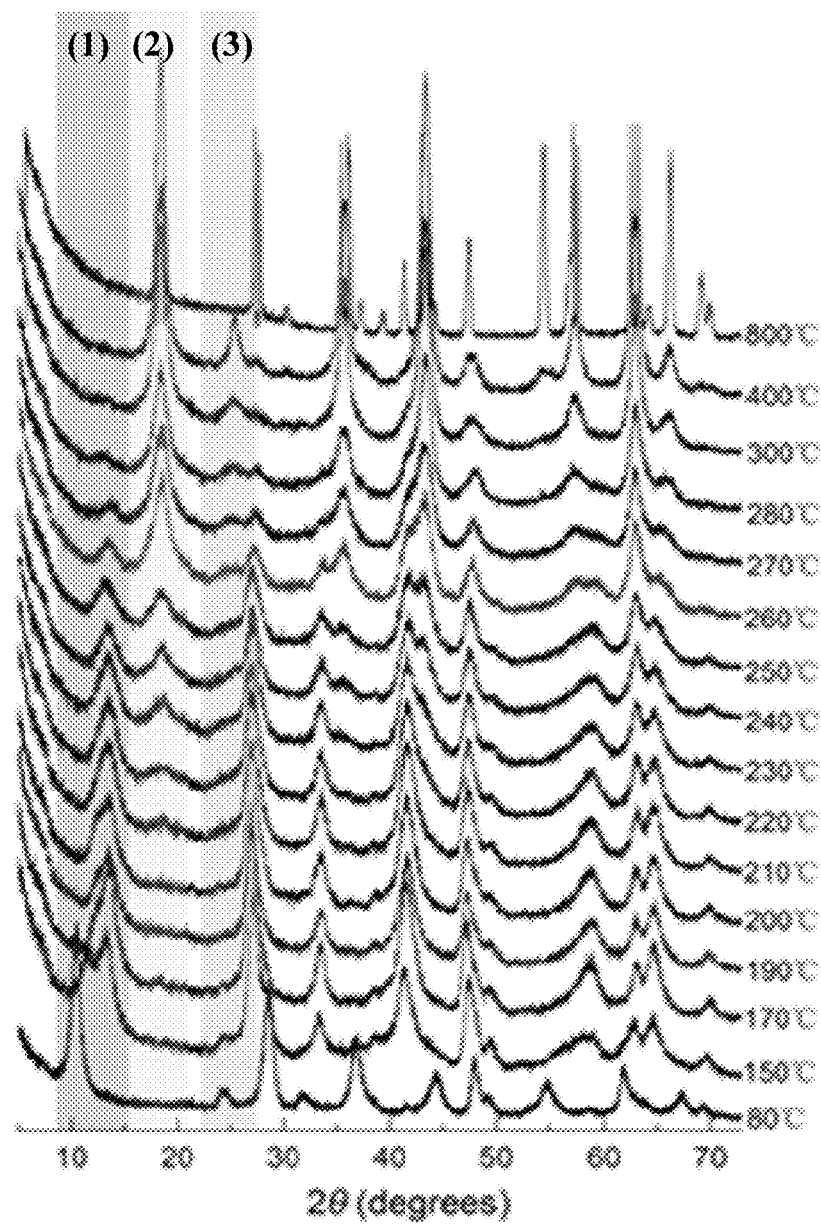
FIG. 4 is X-ray diffraction (XRD) patterns of materials corresponding different heating temperatures.

Referring to FIG. 3, under the HRTEM, the layered structure having an interlayer spacing of about 0.6 nm can be seen in the LS material. The layered structure of the lithium hydrogen titanate Li—H—Ti—O material is sustained by having sufficient amount of the pseudohydrates. That is, if the material is over heated (e.g., above 500° C.), the pseudohydrates will be completely removed from the material and the layered structure will collapse and completely transformed into rutile $TiO_2$ and spinel $Li_4Ti_5O_{12}$. Referring to FIG. 4, to demonstrate the phase transformation in the material corresponding to the heating temperature, one embodiment of the fourth precursor is respectively heated at approximately 80° C., 150° C., 170° C., 190° C., 200° C., 210° C., 220° C., 230° C., 240° C., 250° C., 260° C., 270° C., 280° C., 300° C., 400° C., and 800° C., and corresponded XRD analyses are applied to the products obtained from the heating steps. The temperature range 200° C. to 400° C. corresponds to the gradual collapse of the layered structure and the growth of three-dimensional (3D) $Li_4Ti_5O_{12}$ and $TiO_2$ nanocrystallites. With rising temperature in this regime, an increasing proportion of $Li_4Ti_5O_{12}$ and anatase $TiO_2$ nanocrystallites was obtained (corresponding the diffraction peaks appears in the regions (2) and (3) in FIG. 3, respectively); conversely, the proportion of LS decreased (corresponding the diffraction peaks disappears in region (1) in FIG. 3), and also became more defected due to loss of water in the 2D lattice. As the temperature reached 400° C., the diffraction peaks of $Li_4Ti_5O_{12}$ and $TiO_2$ became steep, indicating growth of 3D crystals. Beyond 400° C., no more water came out. The final product at 800° C. is $Li_4Ti_5O_{12}$ and rutile $TiO_2$ (JCPDS No. 21-1276), as anatase $TiO_2$ transformed to rutile $TiO_2$ at a relatively high temperature of 800° C. As shown in the XRD analyses, an optimal dehydration temperature range for achieving the best room temperature electrochemical performance could be 150° C. to 400° C., which is proven by the following electrochemical analyses. Further heating of the system above 400° C. will be counter-productive because the nanostructures could either aggregate and coarsen or change from 2D to 3D forms, where not only the rate capability degrades, but also the cyclability. By carefully setting the temperature ranges, the level of dehydration after hydrothermal reaction is optimized. Since phase transformation driven by dehydration could be a valuable tool for nanostructure refinement, whereas complete dehydration by further heating can coarsen the structures and actually degrade electrochemical performance.

Figure 5:
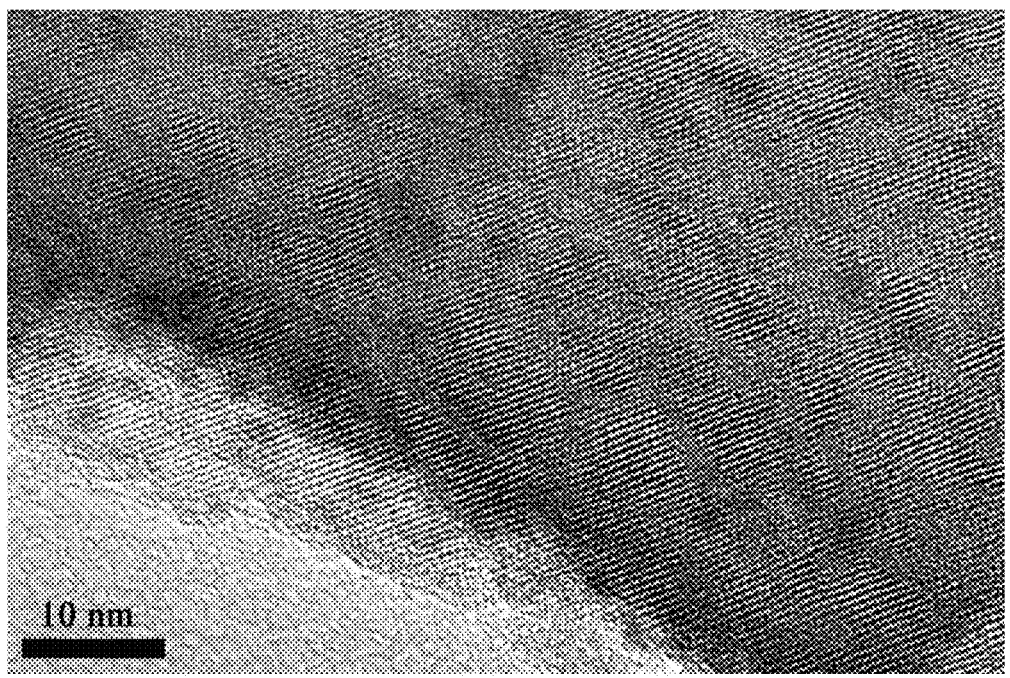
FIG. 5 is a transmission electron microscope (TEM) image of one embodiment of the lithium hydrogen titanate Li—H—Ti—O material.
Figure 6:
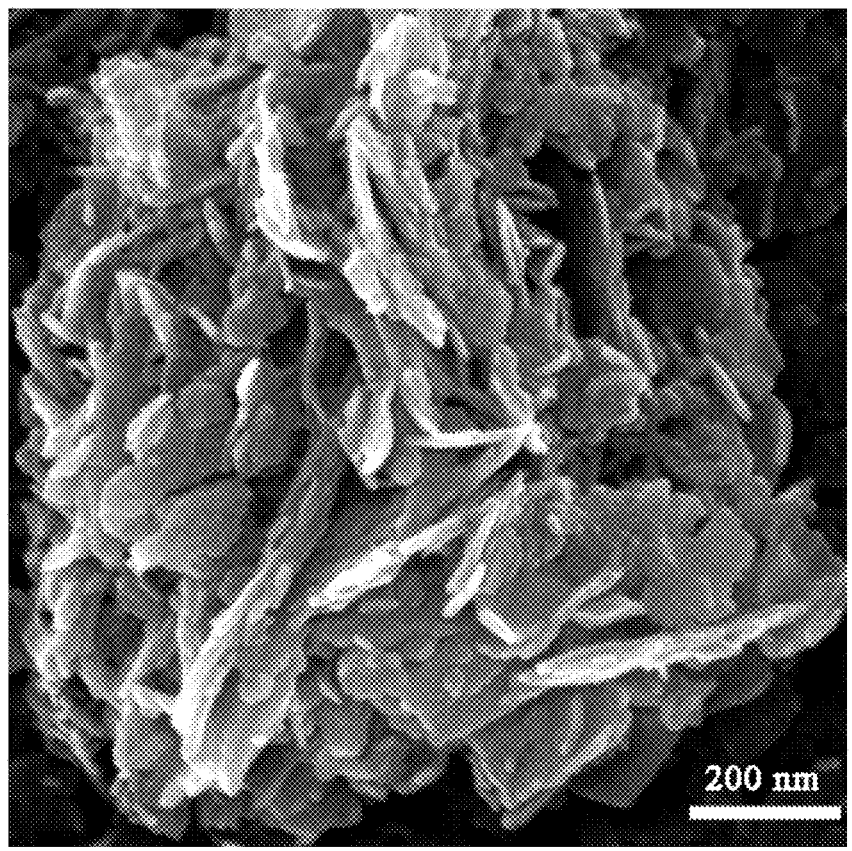
FIG. 6 is a scanning electron microscope (SEM) image of the embodiment of the lithium hydrogen titanate Li—H—Ti—O material in FIG. 5.

The materials design philosophy for the present lithium hydrogen titanate Li—H—Ti—O materials is the following: (i) water may not be bad actor for electrochemical cycling in aprotic electrolyte if they are arrested in the lattice as the pseudohydrates and not free; (ii) as water promotes structural diversity in hydrothermal reaction, it could be used to tailor the initial structures into the layered structure, which greatly improves the ion diffusivity; and (iii) the dehydration process thereafter should be carefully optimized. During the heating step in S24-LS and S24-HN, all the "free" water and loosely bound water (adsorbed water and interlayered water) should be driven out; but as it is not an integral part of the lattice, this usually does not cause drastic phase change. Then as temperature is further raised in step S25-HN, a part of the pseudohydrates embedded in the lattice are also partially driven out; as they were strongly embedded in the lattice, their partial removal can cause drastic phase transformation, during which the nanostructures are refined, as the old structure is being dismantled and turned into a defected form, and new phases are nucleated as nanocrystals, which must start out very small by definition. Referring to FIG. 5, these sub-10 nm new phases of $Li_4Ti_5O_{12}$ and $TiO_2$ are well-anchored on the 2D substrate, providing structural stability during high-rate room temperature cycling, as well as a hybrid supercapacitor-battery kinetics and the best capacity/rate/cyclability combination. Referring to FIG. 6, the appearance of the HN material is in shape of nanosheets with a thickness of about 10 nm to about 20 nm.

The low temperature in situ growing of the $Li_4Ti_5O_{12}$ and $TiO_2$ nanostructures not only decreases an aggregation of the nanosized structures, which commonly appears in non-in-situ growth but also avoids an overgrowth for the sizes of the nanostructures and coarsening of the material, which commonly appears in high temperature heating (e.g., above 500° C.). In the HN material, the interfaces between the LS material and the $Li_4Ti_5O_{12}$ and $TiO_2$ nanostructures have lithium storage effect that are combined with the nanosize effect, supportive effect and conducting enhance effect of the LS material, and with the porous and coarse nanostructure of the HN material, to greatly increase the rate capability and cycling performance of the lithium ion battery. The HN material and the method for making the same solve the problems caused by conventional methods for making $Li_4Ti_5O_{12}$ and $TiO_2$ at the high temperature which are the over growth of the crystalline size and the decrease of the interfaces between different phases, the aggregation problem in the nanosized $Li_4Ti_5O_{12}$ and $TiO_2$, and the low electronic conductivities, rate capabilities, and capacity retentions of the batteries using the conventional $Li_4Ti_5O_{12}$ and $TiO_2$.

The methods for making the LS material and the HN material are mild that do not require any high temperature heating step which is necessary for conventional preparations of $Li_4Ti_5O_{12}$ and $TiO_2$. Low price reactants that are easy to be obtained are used in the methods for making the lithium hydrogen titanate Li—H—Ti—O material. The methods are adapted to be industrialized, have high output rates and a wide application prospection in the fields such as hybrid vehicle, electric vehicle, and quick-charging electronic devices.

As known in the art, water is a harmful substance in conventional lithium ion batteries for the reason that components such as $LiPF_6$ as the most widely used lithium salt in electrolyte solution intend to be decomposed upon water. Therefore, a standard procedure in a conventional lithium ion battery manufactory is thoroughly eliminating water. For example, the $LiPF_6$ must be dissolved in organic solvents to form a nonaqueous electrolyte solution, and the lithium ion battery must be assembled in an environment without water (e.g., in an argon filled glove box). For the same reason, water in ordinary form and other equivalent forms such as absorption water, interlayer water, constitutional water (or water of constitution), and even hydrogen elements are used to be eliminated from the electrodes.

Contrary to the conventional knowledge, the LS material and the HN material containing great amounts of H are capable of cycling for a great number of times in the conventional nonaqueous electrolyte solution. The test result reveals that the H element are stable in the structure of the LS material and the HN material, and unable to be dehydrated from the electrode during the cycling. Though the absorption water and interlayer water are still harmful to the battery, the constitutional water is harmless to the performance of the battery. The heating at lower temperature (below 400° C.) only remove the absorption water and the crystallographic water, not the constitutional water. In addition, compared to the conventional making of the $Li_4Ti_5O_{12}$ and $TiO_2$ which need high temperature treatments, the preparations of the LS material and the HN material are at relatively lower temperature, which are energy conservation methods.

An embodiment of a lithium ion battery using at least one of the above disclosed LS material and HN material comprises a cathode, an anode, a separator, and an electrolyte. The cathode and the anode can be spaced from each other by the separator. The electrolyte can be sandwiched between the cathode and the anode and can conduct lithium ions between the cathode and the anode.

The cathode comprises a cathode current collector and a cathode material layer. The cathode current collector can be used to support the cathode material layer and conduct current. A shape of the cathode current collector can be sheet shape or network shape. A material of the cathode current collector can be aluminum, titanium, or stainless steel. The cathode material layer can be disposed on at least one surface of the cathode current collector.

The anode comprises an anode current collector and an anode material layer. The anode current collector can be used to support the anode material layer and conduct current. A shape of the anode current collector can be sheet shape or network shape. A material of the anode current collector can be copper, nickel, or stainless steel. The anode material layer can be disposed on at least one surface of the anode current collector.

In one embodiment, the cathode material layer comprises at least one of the above disclosed LS material and HN material as a cathode active material. In this embodiment, the anode material layer comprises an anode active material, such as graphite, having an electrical potential lower than the used LS material or HN material.

In another embodiment, the anode material layer comprises at least one of the above disclosed LS material and HN material as an anode active material. In this embodiment, the cathode material layer comprises a cathode active material, such as a lithium transition metal oxide (e.g., lithium cobalt oxide, lithium nickel oxide, lithium manganese oxide, lithium iron phosphate, and lithium manganese phosphate), having an electrical potential higher than the used LS material or HN material.

The anode material layer and cathode material layer can further comprise a conducting agent and a binder. In the cathode, the cathode active material, the conducting agent, and the binder can be uniformly mixed with each other. In the anode, the anode active material, the conducting agent, and the binder can be uniformly mixed with each other. The conducting agent can be carbonaceous materials, such as at least one of carbon black, conducting polymers, acetylene black, carbon fibers, carbon nanotubes, and graphite. The binder can be at least one of polyvinylidene fluoride (PVDF), polyvinylidene difluoride, polytetrafluoroethylene (PTFE), fluoro rubber, ethylene propylene diene monomer, and styrene-butadiene rubber (SBR). In another embodiment, the cathode can be lithium metal.

In one embodiment, the anode material layer are only comprised of at least one of the above disclosed LS material and HN material as an anode active material. No conducting agent may be needed due to the superior electrical conductivities of the LS material and HN material.

In another embodiment, the cathode material layer are only comprised of the at least one of the above disclosed LS material and HN material as a cathode active material. No conducting agent may be needed due to the superior electrical conductivities of the LS material and HN material.

The separator can be a polyolefin microporous membrane, modified polypropylene fabric, polyethylene fabric, glass fiber fabric, superfine glass fiber paper, vinylon fabric, or composite membrane of nylon fabric and wettable polyolefin microporous membrane composited by welding or bonding. The polyolefin porous membrane can be selected from a polypropylene porous membrane, a polyethylene porous membrane, or a lamination of a polypropylene porous membrane and a polyethylene porous membrane.

The electrolyte can comprise a lithium salt and a non-aqueous solvent dissolving the lithium salt. The lithium salt can be at least one of $LiPF_6$, $LiBF_4$, $LiAsF_6$, $LiSbF_6$, $LiCl_4$, $LiAlCl_4$, $LiGaCl_4$, $LiNO_3$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $Li(C_6H_5)_4$, and $LiCF_3SO_3$. The non-aqueous solvent can be at least one of ethylene carbonate, propylene carbonate, butylene carbonate, gamma-butyrolactone, dipropyl carbonate, N-methyl pyrrolidone, N-methylformamide, N-methylacetamide, N,N-dimethylformamide, N,N-diethylformamide, acetonitrile, succinonitrile, 1,4-dicyanobutane, glutaronitrile, dimethyl sulfoxide, dimethyl sulfite, vinylene carbonate, ethylmethyl carbonate, dimethyl carbonate, diethyl carbonate, 4-fluoro-1,3-dioxolan-2-one, chloropropylene carbonate, anhydride, sulfolane, methoxymethylsulfone, tetrahydrofuran, 2-methyltetrahydrofuran, epoxy propane, methyl acetate, ethyl acetate, methyl butyrate, ethyl propionate, methyl propionate, 1,3-dioxolane, acetal, 1,2-dimethoxyethane, and 1,2-dibutyldi.

Examples for Titanic Acid Nanosized Material Preparation

Example 1

2.5 g of $TiO_2$ and 80 mL of 10 mol/L NaOH water solution are mixed together and stirred for about 4 hours followed by a hydrothermal reaction at about 100° C. for about 48 hours. The product of the hydrothermal reaction is stirred in abundant amount of 0.1 mol/L dilute nitric acid for about 0.5 hours, pump filtered, and then dried at about 60° C. to obtain a white and fluffy titanic acid nano powder.

Example 2

6.5 g of $TiO_2$ and 80 mL of 12 mol/L KOH water solution are mixed together and stirred for about 3 hours followed by a hydrothermal reaction at about 150° C. for about 24 hours. The product of the hydrothermal reaction is stirred in abundant amount of 0.4 mol/L dilute hydrochloric acid for about 8 hours, pump filtered, and then dried at about 60° C. to obtain a white and fluffy titanic acid nano powder.

Example 3

9.5 g of $TiO_2$ and 80 mL of 15 mol/L NaOH water solution are mixed together and stirred for about 5 hours followed by a hydrothermal reaction at about 180° C. for about 24 hours. The product of the hydrothermal reaction is stirred in abundant amount of 0.8 mol/L dilute hydrochloric acid for about 24 hours, pump filtered, and then dried at about 60° C. to obtain a white and fluffy titanic acid nano powder.

Examples for LS Material Formation

Example 4

0.05 g of the titanic acid nano powder and 40 mL of 0.05 mol/L LiCl water solution are mixed together and the pH of the solution was adjusted to 8.0 by using 1 mol/L NaOH. The solution was stirred for about 2 hours followed by a hydrothermal reaction at about 100° C. for about 72 hours. The product of the hydrothermal reaction is centrifugalized or pump filtered, then heated by elevating the temperature from room temperature to 150° C. and keeping the product at 150° C. for about 5 hours to obtain the LS material-1, which can be represented by a chemical formula of $Li_{1.44}H_{3.66}Ti_{0.96}O_{4.47-x}$ (x=1.52, x represents O vacancy).

Example 5

2.5 g of the titanic acid nano powder and 40 mL of 1 mol/L LiOH water solution are mixed together and stirred for about 0.5 hours followed by a hydrothermal reaction at about 150° C. for about 24 hours. The product of the hydrothermal reaction is centrifugalized or pump filtered, then heated by elevating the temperature from room temperature to 170° C. and keeping the product at 170° C. for about 0.5 hours to obtain the LS material-2. Referring to FIG. 3, the LS material-2 is a layered structure having an interlayer spacing of 0.6 nm, which can be represented by a chemical formula of $Li_{0.43}H_{1.25}Ti_{1.11}O_{3.06-x}$ (x=1.69, x represents O vacancy).

Example 6

4 g of the titanic acid nano powder and 40 mL of 1 mol/L $Li_2SO_4$ water solution are mixed together and the pH of the solution was adjusted to 14.0 by using 1 mol/L NaOH. The solution was stirred for about 4 hours followed by a hydrothermal reaction at about 180° C. for about 48 hours. The product of the hydrothermal reaction is centrifugalized or pump filtered, then heated by elevating the temperature from room temperature to 200° C. and keeping the product at 200° C. for about 2 hours to obtain the LS material-3, which can be represented by a chemical formula of $Li_{1.23}H_{2.12}Ti_{1.07}O_{3.82-x}$ (x=1.3, x represents O vacancy).

Examples for HN Material Formation

Example 7

The LS material-1 formed in Example 4 are further heated by elevating the temperature from 150° C. to 210° C., and keeping the product at 210° C. for about 1 hour to obtain the HN material-1, which can be represented by a chemical formula of $Li_{1.44}H_{1.16}Ti_{0.96}O_{6.44-x}$ (x=4.83, x represents O vacancy).

Example 8

The LS material-2 formed in Example 5 are further heated by elevating the temperature from 170° C. to 280° C., and keeping the product at 280° C. for about 0.5 hours to obtain the HN material-2, which can be represented by a chemical formula of $Li_{0.43}H_{1.01}Ti_{1.11}O_{5.88-x}$ (x=4.67, x represents O vacancy). Referring to FIG. 4, spinel $Li_4Ti_5O_{12}$(JCPDS No. 49-0207) and anatase $TiO_2$ (JCPDS No. 89-4921) nanocrystallites can be identified by the diffraction peaks, while the diffraction peaks for the LS material still exist. Referring to FIG. 5, the $Li_4Ti_5O_{12}$ and $TiO_2$ nanostructures can be found in the HN material. Referring to FIG. 6, the appearance of the HN material is a plurality of nano sheets.

Example 9

The LS material-3 formed in Example 6 are further heated by elevating the temperature from 200° C. to 400° C., and keeping the product at 400° C. for about 10 hours to obtain the HN material-3, which can be represented by a chemical formula of $Li_{1.23}H_{1.72}Ti_{1.07}O_{3.62-x}$ (x=1.44, x represents O vacancy).

Comparative Example 1

A comparison can be made by further heating the HN material after step S25-HN by elevating the temperature of the HN material to about 800° C. to form a Li—Ti—O material. By XRD analyzing the obtained product of the comparison, the diffraction peaks corresponding the LS material disappear, the anatase $TiO_2$ is transformed into rutile $TiO_2$, and the intensity of the diffraction peaks for $Li_4Ti_5O_{12}$ greatly increase.

Examples for Electrode Preparation and Battery Assemblage

Example 10

The LS material-2 made in Example 5, conducting carbon black (super P), and PVDF having a mass ratio of 8:1:1 are added into 10 mL of NMP solvent, and mixed with each other to obtain a slurry. The slurry is applied on an aluminum foil as the current collector, and dried at 100° C. in vacuum to obtain a Li—H—Ti—O electrode-1.

A 2032 coin type lithium ion battery-1 is assembled in glove box by using a lithium metal as an anode, the prepared Li—H—Ti—O electrode-1 as a cathode, Celgard 2400 polypropylene porous film as a separator, and a solution of lithium hexafluorophosphate ($LiPF_6$) in mixed solvents of ethylene carbonate (EC) and dimethyl carbonate (DMC) (a volume ratio of EC and DMC is 1:1) as an electrolyte. A concentration of the $LiPF_6$ in the solution is about 1 mol/L. The glove box is filled with argon gas. Water and oxygen gas in the glove box are both lower than 1 ppm.

Example 11

A Li—H—Ti—O electrode-2 is made by using the same method as in Example 10, except that the LS material-2 is replaced by the HN material-2 made in Example 8.

A 2032 coin type lithium ion battery-2 is assembled by using the same method as in Example 10 except that the Li—H—Ti—O electrode-1 is replaced by the Li—H—Ti—O electrode-2.

Example 12

Only the LS material-2 made in Example 5 and PVDF having a mass ratio of 85:15 are added into 10 mL of NMP solvent to obtain a slurry. The slurry can be applied on an aluminum foil as the current collector, and dried at 100° C. in vacuum to obtain a Li—H—Ti—O electrode-3.

A 2032 coin type lithium ion battery-3 can be assembled by using the method same as in Example 10 except that the Li—H—Ti—O electrode-1 is replaced by the Comparative Example 2

A Li—Ti—O electrode-C can be made by using the same method as in Example 10, except that the LS material-2 is replaced by the Li—Ti—O material made in Comparative Example 1.

A 2032 coin type lithium ion battery-C can be assembled by using the method same as in Example 10 except that the Li—H—Ti—O electrode-1 is replaced by the Li—Ti—O electrode-C.

Li-Ion Diffusion Coefficient Test

Referring to Table 1, Li-ion diffusion coefficients (Du) at various charge of state (SOC) in the Li—H—Ti—O electrode-1, Li—H—Ti—O electrode-2, and Li—Ti—O electrode are conducted via low-frequency Warburg contribution of the impedance response. The calculated Du for Li—H—Ti—O electrode-1 (LS) is $8.21 \times 10^{-9}$ $cm^2s^{-1}$ to $2.46 \times 10^{-8}$ $cm^2s^{-1}$ and for Li—H—Ti—O electrode-2 (HN) is $2.72 \times 10^{-10}$ $cm^2s^{-1}$ to $1.17 \times 10^{-8}$ $cm^2s^{-1}$, which are about 3 orders of magnitude higher than Li—Ti—O electrode (DN) obtained at 800° C. The calculated $D_{Li}$ for the Li—Ti—O electrode is $6.81 \times 10^{-14}$ $cm^2s^{-1}$ to $2.46 \times 10^{-11}$ $cm^2s^{-1}$. Therefore, the Li—H—Ti—O material could be used as a fast ion conductor for electrolyte application.

TABLE 1

The Li-ion diffusion coefficients of LS, HN and DN electrodes at different depths of discharge.

| | Diffusion coefficient ($cm^2 s^{-1}$) | | |
|---|---|---|---|
| Depth of discharge | LS | HN | DN |
| 25% | 2.10E−08 | 2.72E−10 | 4.87E−13 |
| 50% | 8.34E−09 | 2.93E−10 | 2.66E−13 |
| 75% | 2.46E−08 | 1.00E−09 | 6.81E−14 |
| 100% | 8.21E−09 | 1.17E−08 | 2.46E−11 |

Electrochemical Performance Test

Figure 7:
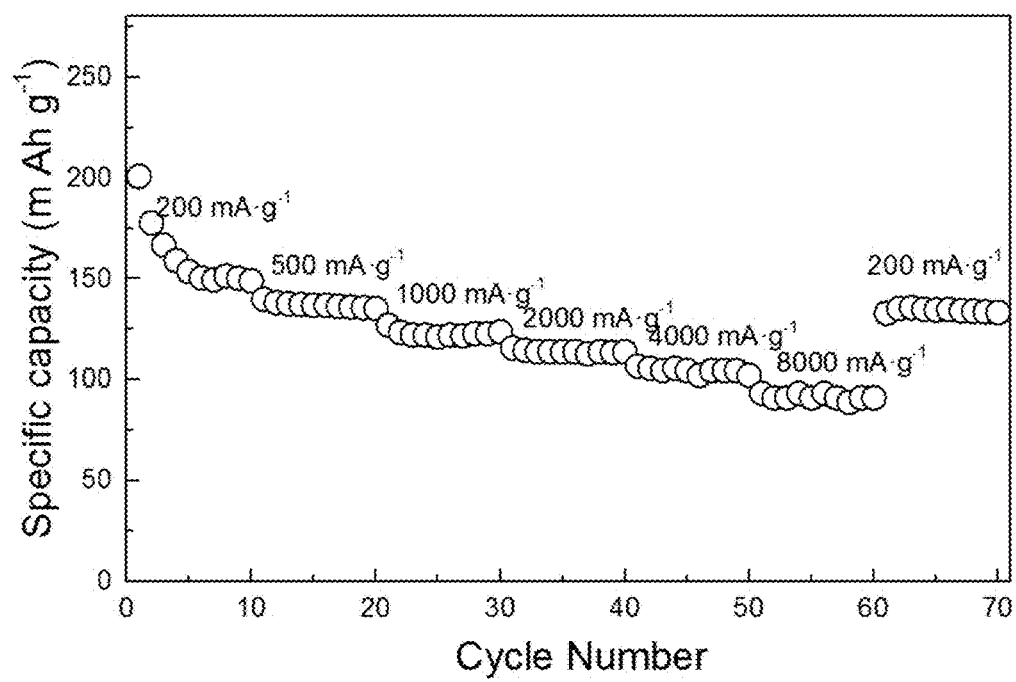
FIG. 7 is a graph showing discharge specific capacities at different current densities of a lithium ion battery using the embodiment of the lithium hydrogen titanate Li—H—Ti—O material formed in Example 5.
Figure 8:
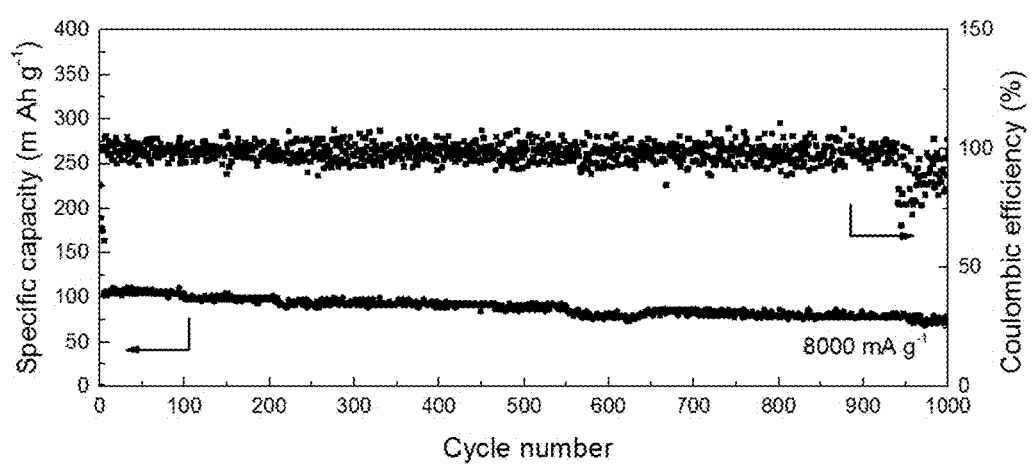
FIG. 8 is a graph showing cycling performance and coulombic efficiency at a current density of 8000 mA/g of the lithium ion battery using the embodiment of the lithium hydrogen titanate Li—H—Ti—O material formed in Example 5.
Figure 9:
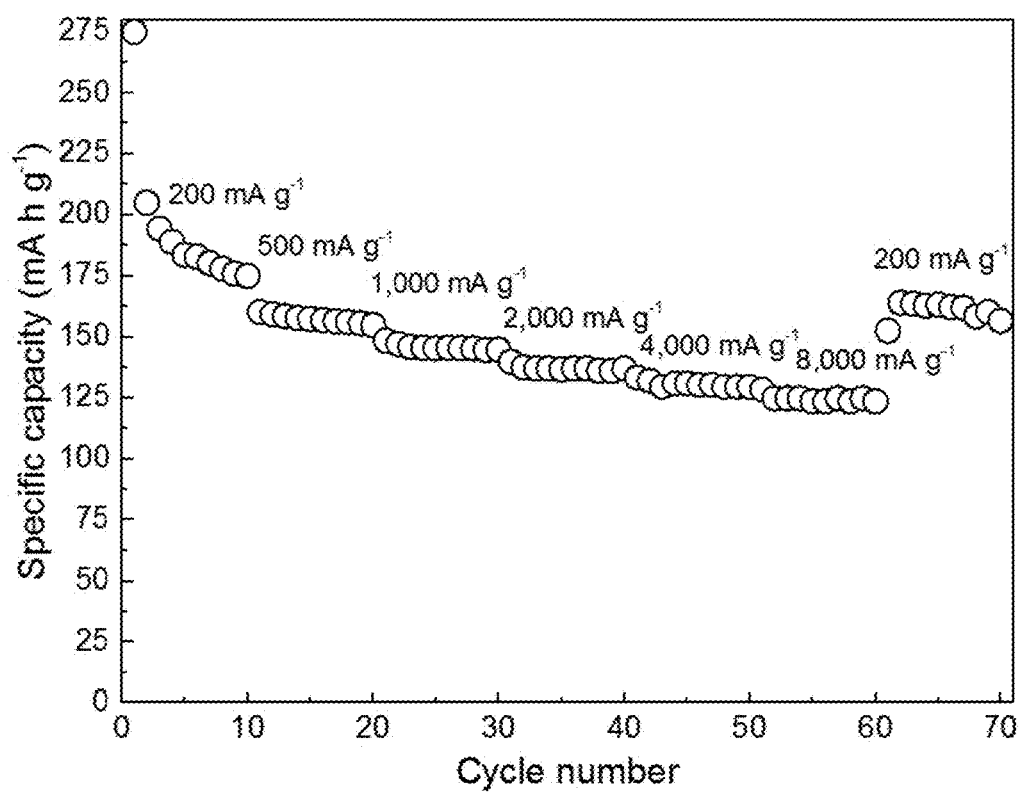
FIG. 9 is a graph showing discharge specific capacities at different current densities of a lithium ion battery using the embodiment of the lithium hydrogen titanate Li—H—Ti—O material formed in Example 8.
Figure 10:
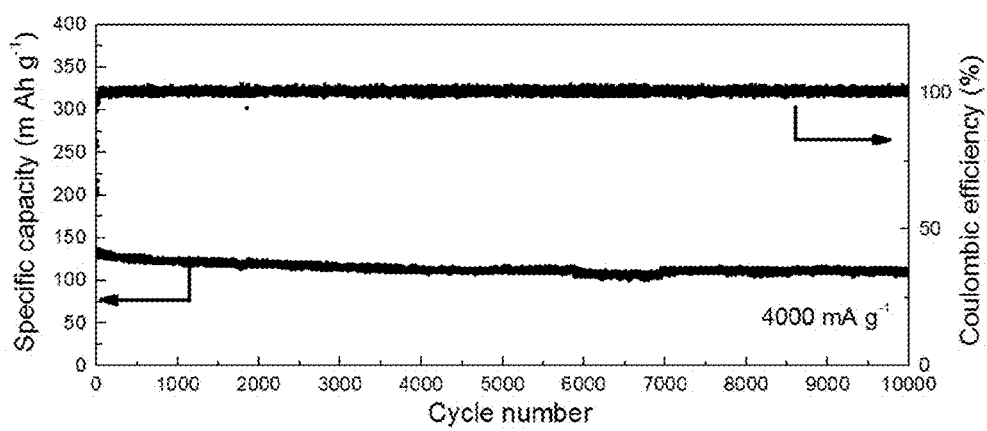
FIG. 10 is a graph showing cycling performance and coulombic efficiency at a current density of 4000 mA/g of the lithium ion battery using the embodiment of the lithium hydrogen titanate Li—H—Ti—O material formed in Example 8.
Figure 11:
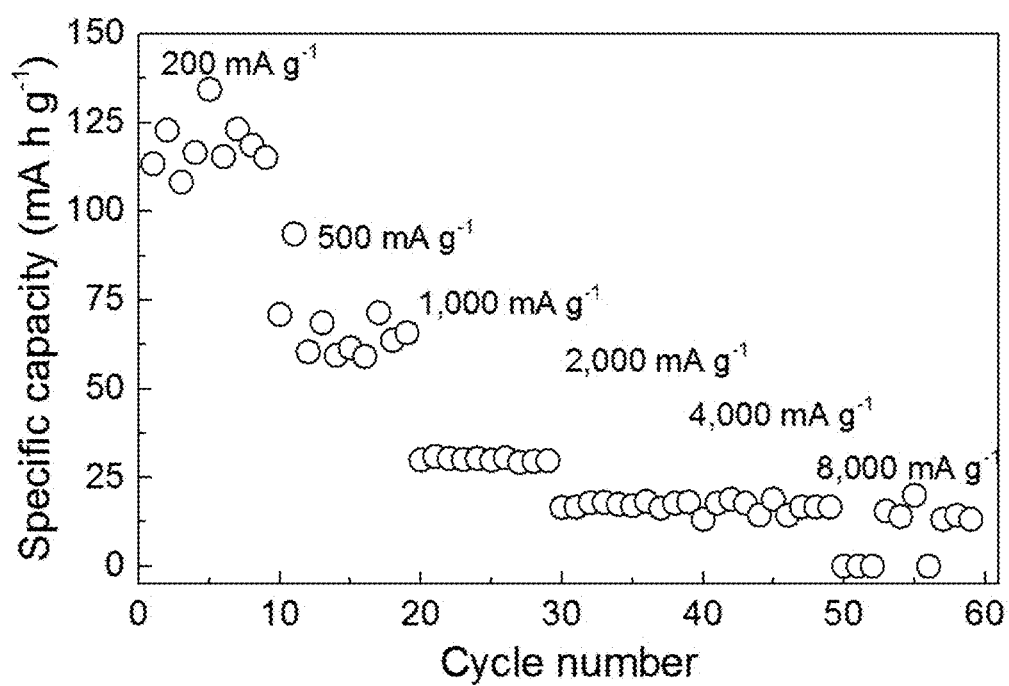
FIG. 11 is a graph showing discharge specific capacities at different current densities of a comparative lithium ion battery using the embodiment of the Li—Ti—O material formed in Comparative Example 1.
Figure 12:
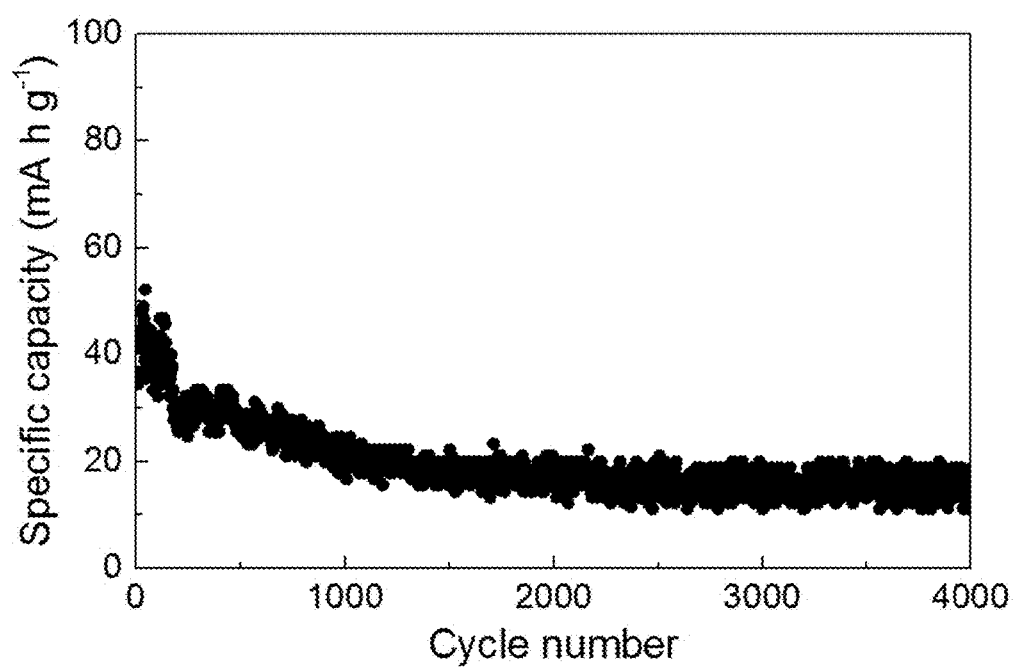
FIG. 12 is a graph showing cycling performance and coulombic efficiency at a current density of 4000 mA/g of the comparative lithium ion battery using the embodiment of the Li—Ti—O material formed in Comparative Example 1.

The above assembled lithium ion batteries 1 to 3 and battery-C are galvanostatic discharged and charged at room temperature between 1.0V to 2.5V. Referring to FIGS. 7, 9, and 11, the rate capabilities of the battery-1, battery-2, and battery-C are tested by respectively cycling the batteries at current densities of 200 $mA \cdot g^{-1}$, 500 $mA \cdot g^{-1}$, 1000 $mA \cdot g^{-1}$, 2000 $mA \cdot g^{-1}$, 4000 $mA \cdot g^{-1}$, and 8000 $mA \cdot g^{-1}$. When discharged at 100 mA $g^{-1}$, owing to the surface reactions of LS material together with the additional Li storage at the interfaces among $Li_4Ti_5O_{12}$—$TiO_2$-LS, battery-2 has a reversible capacity of 205 mA h $g^{-1}$, which is higher than battery-1 (174 $mA \cdot h \cdot g^{-1}$) or battery-C (138 $mA \cdot h \cdot g^{-1}$). As the current density increased to 8,000 $mA \cdot g^{-1}$, the specific capacities of battery-1 and battery-2 gently decreased to 91 $mA \cdot h \cdot g^{-1}$ and 124 $mA \cdot h \cdot g^{-1}$ respectively, which demonstrate their superior rate capabilities. The capacity of battery-C, in contrast, plummets to 17 $mA \cdot h \cdot g^{-1}$ at 2,000 $mA \cdot g^{-1}$ and ends in almost zero at higher current density. Referring to FIG. 8, the LS material demonstrates a quite stable performance for ultrafast lithium ions insertion/extraction at a high current rate of 8,000 mA·g$^{-1}$ (~70 C) for 1,000 cycles with 76% capacity retention of its initial capacity 106 mA·h·g$^{-1}$. Referring to FIG. 10, the HN electrode exhibits superior cycling capacity of about 130 mA·h·g$^{-1}$ at 4,000 mA·g$^{-1}$ (fully charged within ~100 seconds) and sustains more than 10,000 cycles with 86% capacity retention (ca. Coulombic efficiency remains almost 100%). Referring to FIG. 12, the high rate capacity of battery-C at 4,000 mA g$^{-1}$, in contrast, drops rapidly to smaller than 20 mA·h·g$^{-1}$ for the first 500 cycles, and died completely after 1,000 cycles. In terms of mass loading, rate and cyclability, the HN and LS are two very promising materials (both hydrated) for fast-charging Li-ion batteries or even supercapacitors.

Figure 13:
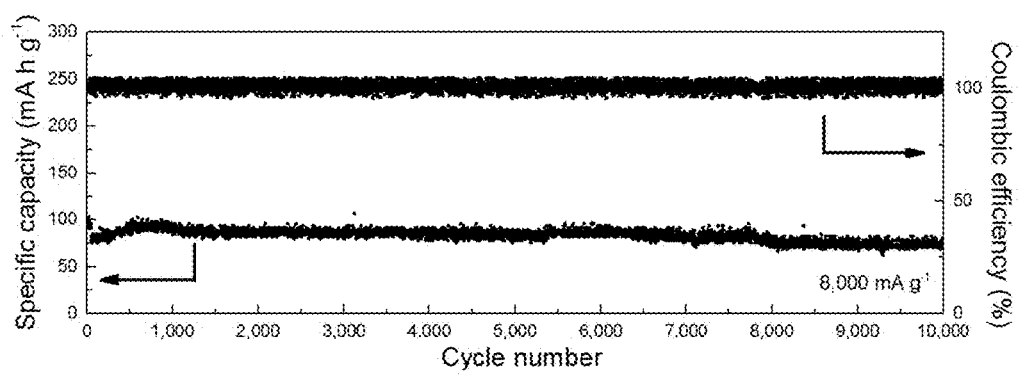
FIG. 13 is a graph showing cycling performance and coulombic efficiency at a current density of 8000 mA/g of the lithium ion battery using the electrode formed in Example 12 without any conducting agent.

To demonstrate this point, we further tested the electrochemical performance of the HN material even without any conducting agent (e.g. coating carbon and carbon black). Referring to FIG. 13, battery-3 is cycled at a high current density 8,000 mA·g$^{-1}$ (70 C, charged within 50 s) for 10,000 cycles. Surprisingly, it also exhibits an ultrastable cycling performance (10,000 cycles with capacity fade of only 2×10$^{-3}$% per cycle) under with almost 100% Coulombic efficiency, proving its superior tolerance of ultrafast transport for both e$^-$ and Li$^+$ in aprotic electrolyte systems.

Depending on the embodiment, certain of the steps of methods described may be removed, others may be added, and the sequence of steps may be altered. It is also to be understood that the description and the claims drawn to a method may comprise some indication in reference to certain steps. However, the indication used is only to be viewed for identification purposes and not as a suggestion as to an order for the steps.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A lithium hydrogen titanate Li—H—Ti—O material comprising Li, H, Ti, and O elements, wherein a mass percentage of Li is in a range from about 4% to about 12%, a mass percentage of H is in a range from about 0.1% to about 5%, a mass percentage of Ti is in a range from about 48% to about 56%, and a mass percentage of O is in a range from about 28% to about 47%.

2. The lithium hydrogen titanate Li—H—Ti—O material of claim 1, wherein some of the Li, Ti, and O elements are in forms of a plurality of Li$_4$Ti$_5$O$_{12}$ and TiO$_2$ nanostructures.

3. The lithium hydrogen titanate Li—H—Ti—O material of claim 2, wherein the Li, Ti, O, and H elements not in forms of Li$_4$Ti$_5$O$_{12}$ and TiO$_2$ nanostructures are in a form of a layered structure material.

4. The lithium hydrogen titanate Li—H—Ti—O material of claim 3, wherein in the layered structure material, some of the Li, Ti, and O elements are in forms of pseudohydrates.

5. The lithium hydrogen titanate Li—H—Ti—O material of claim 4, wherein the pseudohydrates are selected from the group consisting of hydroxide ions, hydroxonium ions, —OH groups, —H groups, and combinations thereof.

6. The lithium hydrogen titanate Li—H—Ti—O material of claim 2, wherein the plurality of Li$_4$Ti$_5$O$_{12}$ and TiO$_2$ nanostructures are uniformly and dispersingly distributed.

7. The lithium hydrogen titanate Li—H—Ti—O material of claim 2, wherein the plurality of Li$_4$Ti$_5$O$_{12}$ and TiO$_2$ nanostructures are smaller than 10 nm.

8. The lithium hydrogen titanate Li—H—Ti—O material of claim 3, wherein the plurality of Li$_4$Ti$_5$O$_{12}$ and TiO$_2$ nanostructures are in situ grown on the layered structure material.

9. A lithium ion battery comprising a cathode, an anode, a separator, and an electrolyte, the cathode and the anode are separated from each other by the separator, the electrolyte conducts lithium ions between the cathode and the anode, wherein the cathode or the anode comprises a lithium hydrogen titanate Li—H—Ti—O material comprising Li, H, Ti, and O elements, a mass percentage of Li is in a range from about 4% to about 12%, a mass percentage of H is in a range from about 0.1% to about 5%, a mass percentage of Ti is in a range from about 48% to about 56%, and a mass percentage of O is in a range from about 28% to about 47%.

10. A method for making a lithium hydrogen titanate Li—H—Ti—O material comprising Li, H, Ti, and O elements, wherein a mass percentage of Li is in a range from about 4% to about 12%, a mass percentage of H is in a range from about 0.1% to about 5%, a mass percentage of Ti is in a range from about 48% to about 56%, and a mass percentage of O is in a range from about 28% to about 47%, the method comprising:

preparing a titanic acid nanosized material;
mixing the titanate acid nanosized material and a lithium salt water solution into a second mixture;
stirring the second mixture for about 0.5 hours to about 4 hours to form a third precursor;
hydrothermal reacting the third precursor at a temperature of about 80° C. to about 200° C. for about 5 hours to about 72 hours to obtain a fourth precursor; and
heating the fourth precursor by elevating the temperature of the fourth precursor to a temperature of about 150° C. to about 200° C., and keeping the fourth precursor at the temperature of about 150° C. to about 200° C. for about 0.5 hours to about 5 hours to obtain a fifth precursor;
heating the fifth precursor by elevating the temperature of the fifth precursor to a temperature of about 200° C. to about 400° C., and keeping the fifth precursor at the temperature of about 200° C. to about 400° C. for about 0.5 hours to about 10 hours to form an HN material.

11. The method of claim 10, wherein the titanic acid nanosized material is prepared by:

mixing a titanium compound and an alkaline water solution into a first mixture;
stirring the first mixture for about 3 hours to about 5 hours to form a first precursor;
hydrothermal reacting the first precursor at a temperature of about 80° C. to about 200° C. for about 4 hours to about 96 hours to obtain a second precursor; and
stirring the second precursor in a sufficient amount of an acidic water solution for about 0.5 hours to about 12 hours to form the titanic acid nanosized material.

12. The method of claim 11, wherein the titanium compound is selected from the group consisting of anatase titanium dioxide, rutile titanium dioxide, metatitanic acid, amorphous titanium dioxide, titanate, and combinations thereof.

13. The method of claim 11, wherein the alkaline water solution comprises an alkali selected from the group consisting of sodium hydroxide, potassium hydroxide, and combinations thereof, a concentration of the alkaline water solution is about 5 mol/L to about 20 mol/L, and a ratio between the titanium compound and the alkaline water solution is 3 g to 14 g of the titanium compound per 100 mL of the alkaline water solution.

14. The method of claim 11, wherein the acidic water solution comprises an acid selected from the group consisting of nitric acid, hydrochloric acid, sulfuric acid, acetic acid, phosphoric acid, oxalic acid, hydrofluoric acid, and combinations thereof.

* * * * *